(12) United States Patent
Yu et al.

(10) Patent No.: US 9,912,431 B2
(45) Date of Patent: Mar. 6, 2018

(54) OPTICAL COMMUNICATION THAT ACHIEVES BAUD RATE GREATER THAN SAMPLE RATE

(71) Applicant: ZTE Corporation, Shenzhen (CN)

(72) Inventors: Jianjun Yu, Basking Ridge, NJ (US); Fan Li, Morristown, NJ (US); Junwen Zhang, Morristown, NJ (US); Xiao Xin, Morristown, NJ (US); Hung-Chang Chien, Bridgewater, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/043,351

(22) Filed: Feb. 12, 2016

(65) Prior Publication Data

US 2016/0248540 A1 Aug. 25, 2016

Related U.S. Application Data (60) Provisional application No. 62/119,698, filed on Feb. 23, 2015.

(51) Int. Cl.
| | |
|---|---|
| H04J 11/00 | (2006.01) |
| H04B 10/516 | (2013.01) |
| H04B 10/548 | (2013.01) |
| H04L 27/26 | (2006.01) |

(52) U.S. Cl.
CPC .......... *H04J 11/00* (2013.01); *H04B 10/5167* (2013.01); *H04B 10/548* (2013.01); *H04L 27/2636* (2013.01); *H04L 27/2649* (2013.01)

(58) Field of Classification Search
CPC .............. H04J 11/00; H04J 2011/0003; H04L 27/2601; H04L 27/2649; H04L 27/2636; H04B 10/548; H04B 10/5167
See application file for complete search history.

(56) References Cited

U.S. PATENT DOCUMENTS 9,369,326 B2 * 6/2016 Kim ...................... H04L 5/0021

OTHER PUBLICATIONS

Dong, Z., et al., "7×224 Gb/s/ch Nyquist-WDM Transmission Over 1600-km SMF-28 Using PDM-CSRZ-QPSK Modulation," IEEE Photonics Technology Letters, 24(13):1157-1159, Jul. 2012.
Huang, B., et al., "Robust 9-QAM digital recovery for spectrum shaped coherent QPSK signal," Optics Express, 21(6):7216-7221, Mar. 2013.
Li, F., et al., "Performance Comparison of DFT-Spread and Pre-Equalization for 8 × 244.2-Gb/s PDM-16QAM-OFDM," Journal of Lightwave Technology, 33(1):227-233, Jan. 2015.
Li, J., et al., "Approaching Nyquist Limit in WDM Systems by Low-Complexity Receiver-Side Duobinary Shaping," Journal of Lightwave Technology, 30(11):1664-1676, Jun. 2012.

(Continued)

*Primary Examiner* — Leslie Pascal
(74) *Attorney, Agent, or Firm* — Perkins Coie LLP (57) ABSTRACT

Duo-binary encoding is used for encoding I and Q data prior to performing orthogonal frequency division multiplexing based transmission using discrete Fourier transform spreading (DFT-S). Advantageously, duo-binary encoding improves robustness of the encoded signal to inter symbol interference, making the degradation caused by the subsequent DFT-S stage less susceptible to reduction in bit error rate performance.

26 Claims, 11 Drawing Sheets

Digital signal processing (DSP) in Transmitter (Tx)

(56) References Cited

OTHER PUBLICATIONS

Li, J., et al., "Building up low-complexity spectrally-efficient Terabit superchannels by receiver-side duobinary shaping," Optics Express, 20(9):10271-10282, Apr. 2012.

Li, J., et al., "Spectrally Efficient Quadrature Duobinary Coherent Systems With Symbol-Rate Digital Signal Processing," Journal of Lightwave Technology, 29(8):1098-1104, Apr. 2011.

Zhang, J., et al., "Improved Quadrature Duobinary System Performance Using Multi-Modulus Equalization," IEEE Photonics Technology Letters, 25(16):1630-1633, Aug. 2013.

Zhang, J., et al., "Multi-Modulus Blind Equalizations for Coherent Quadrature Duobinary Spectrum Shaped PM-QPSK Digital Signal Processing," Journal of Lightwave Technology, 31(7):1073-1078, Apr. 2013.

\* cited by examiner

OPTICAL COMMUNICATION THAT ACHIEVES BAUD RATE GREATER THAN SAMPLE RATE

CROSS REFERENCE TO RELATED APPLICATIONS

This patent document claims the benefit of priority of U.S. Provisional Patent Application No. 62/119,698, filed on Feb. 23, 2015. The entire content of the before-mentioned patent application is incorporated by reference as part of the disclosure of this application.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, among other things, techniques for increasing the transmission data rate of optical OFDM transmissions such that the symbol rate or baud rate is greater than the sampling rate used for digital to analog conversion stage in the transmitter. On the transmitter side, duo-binary encoding may be used for encoding signals prior to processing through a spread-digital Fourier transform (DFT-S) stage. At a receiver-side, duo-binary decoding may be used to recover data bits recovered from DFT-S demodulation.

In one example aspect, a method of optical communication includes receiving data bits for transmission over the optical communication network, encoding the received data bits such that the encoded data bits are duo-binary comprising a zero level and two logical levels, performing an M-point Fourier transform on the output of the duo-binary encoding, thereby producing M output signals, generating, from the M output signals, N output signals, wherein N is less than M, producing time domain samples from the N output signals by performing an inverse Fourier transform, and further processing the time domain samples for transmission over the optical communication network.

In another example aspect, techniques for receiving optical modulated signals to recover data include digitizing a received signal to generate digital samples of the OFDM modulated optical signal, transforming the digital samples using an N point Fourier transform to generate N intermediate output signals, spreading, using a spreading technique, the N intermediate output signals into M signals, wherein M is an integer greater than N, producing time domain representation of symbols of modulated data by performing an M-point Fourier transform on the M signals, and performing differential decoding on the symbols of modulated data to recover data from the modulated optical signal.

These and other aspects, and their implementations and variations are set forth in the drawings, the description and the claims.

DETAILED DESCRIPTION

Considering the ever-increasing demand for high bandwidth data networks, stimulated by emerging internet services in optical access network, it is becoming important to be able to deliver more data within available bandwidth. To ensure the efficient utilization of bandwidth resources, researchers have studied and developed high baud rate signal transmission, advanced modulation formats, multiplexing methods, etc. that increase spectral efficiency measured in terms of the number of bits that can be transmitted per Hertz of bandwidth per second.

Figure 1:
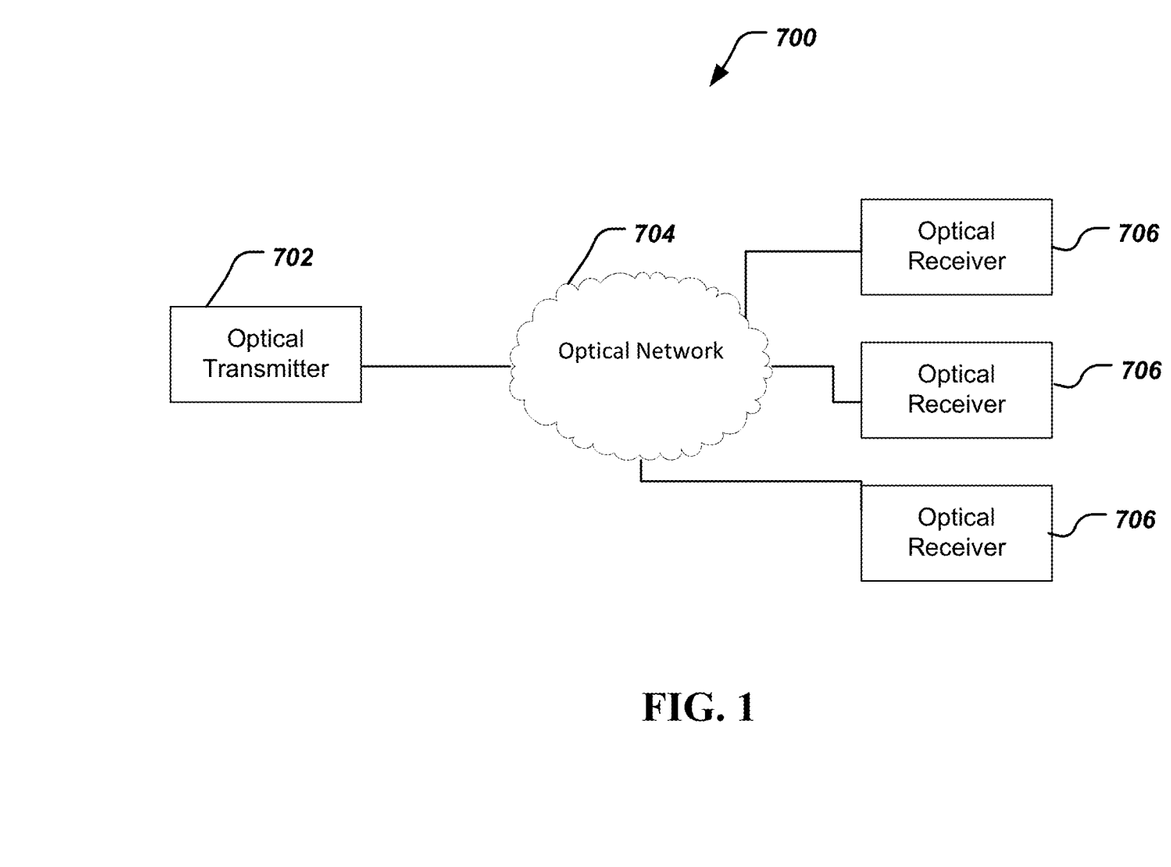
FIG. 1 shows an example optical communication network.

FIG. 1 depicts an optical communication system 700 in which the presently disclosed technology can be practiced. One or more optical transmitters 702 are communicatively coupled via an optical network 704 with one or more optical receivers 706. The optical network 704 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

In the recent years, some optical communication systems have begun using orthogonal frequency division multiplexing (OFDM) modulation scheme for transmitting signals over an optical transmission medium. A typical OFDM signal uses multiple subcarriers that make up a symbol, with each subcarrier being modulated using one or more data bits and a modulation scheme such as Quadrature Phase Shift Keying (QPSK) or Quadrature Amplitude Modulation (QAM). The DC subcarrier is typically not used for modulating signals.

Thus, for a traditional OFDM signal having N subcarriers, and generated using a digital to analog (DAC) conversion stage having G sample rate, the maximum number of data symbols in one OFDM symbols is N−1, corresponding to all subcarriers except the DC subcarrier, and the effective baud rate of the OFDM signal is (N−1)*G/N. Put differently, it means that the maximum symbol/sample ratio is N−1/N, which is less than unity (<1).

One technique used to increase the symbol/sample ration above unity, and thus being able to transmit more data in a given bandwidth, is to use a discrete Fourier Transform spread (DFT-S) technique. In a DFT-S technique, instead of directly applying an Inverse DFT transform to data bits to go from the time domain to the frequency domain, the data is first processed through a DFT spreading. After DFT-S is applied to data in optical OFDM system, the maximum symbol/sample ratio can be increased to more than 1. This gain in symbol to sample ration is due to, in part, introduction of Inter-symbol interference (ISI). The penalty paid for increasing the symbol/sample ratio is that degradation due to errors, e.g., bit error rate (BER) performance typically drops rapidly when the symbol/sample ratio increases.

The present document discloses, among other techniques, the use of duo-binary encoding that can be used to overcome the ISI induced BER degradation. The inventor realized that the power distribution of duo-binary in high frequency is very low and thus even after removing high frequency components, the BER performance of an optical transmission signal generated using duo-binary encoding along with DFT-S should be still very good. In one advantageous aspect, such signals can be used to achieve a greater symbol/sample ratio than just the DFT-S OFDM signal under same BER limitation.

In some embodiments maximum likelihood sequence detection (MLSD) can be used to mitigate the introduced ISI for duo-binary-DFT-S-OFDM signal with baud rate larger than DAC sample rate. These, and other, aspects are disclosed in this document.

Figure 2:
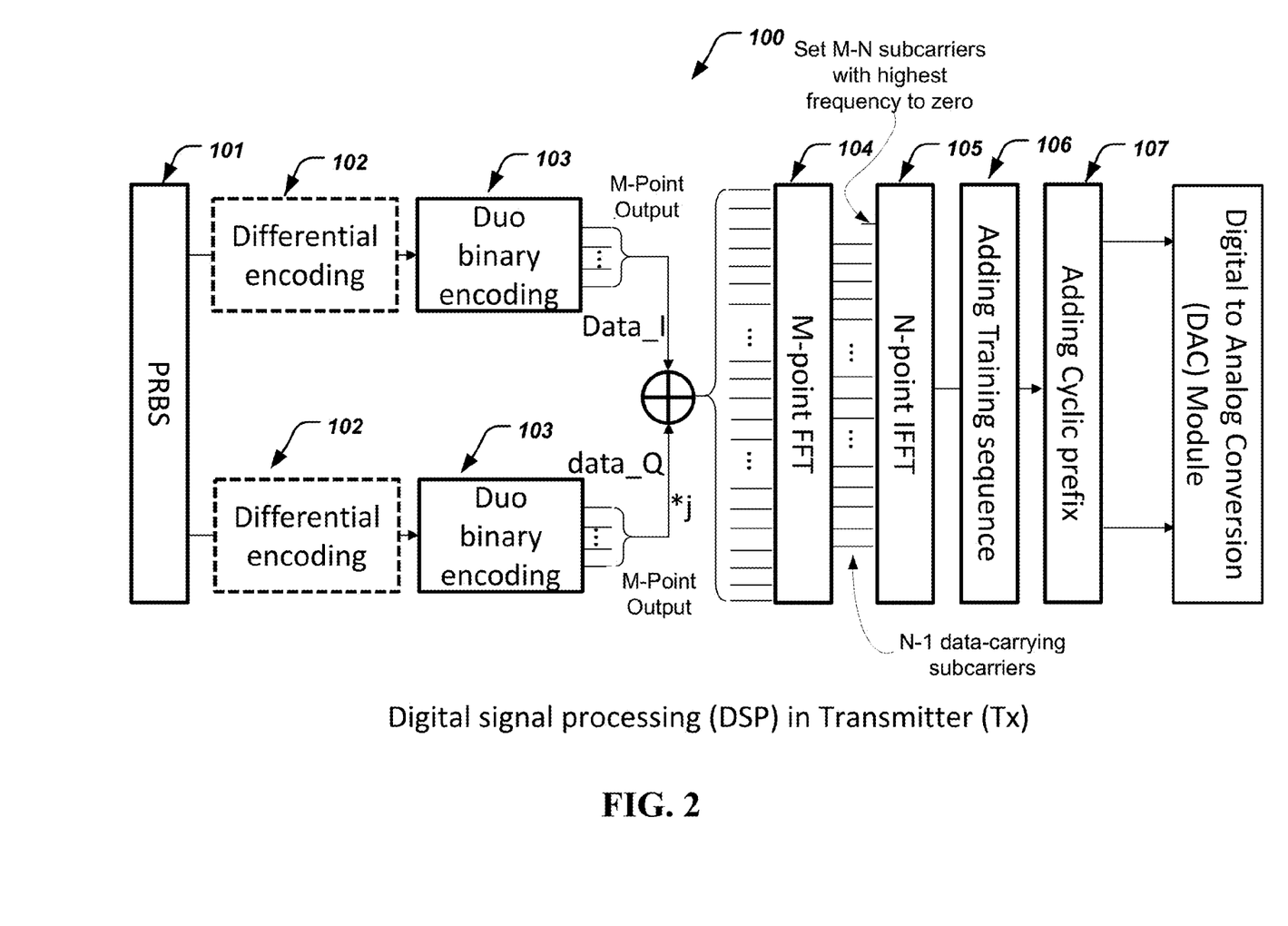
FIG. 2 shows an example transmitter of optical signals.

FIG. 2 shows an example transmitter-side block diagram 100 which may be included in, e.g., optical transmitter 702. The various digital signal processing modules depicted in FIG. 2 and described herein can be implemented in a combination of hardware and/or software instructions executed on a digital signal processor.

The transmitter 100 includes a source of data, e.g., a pseudorandom binary stream PRBS 101, that can be used for testing. The PRBS 101 source can produce data for both the I path and the Q path of the in-phase and quadrature data components.

Both the I and Q data is processed through a differential encoding stage 102 and a duo-binary encoding stage 103. The duo-binary encoding stage 103 may be implemented using a delay and add stage for adding a delayed version of the signal to itself to produce a duo-binary signal.

One advantage or using differential encoding (102) on the transmit-side is that, in the receiver, decoding can be done with just a modulo operation. Alternatively, if a transmitter does not use differential encoding (102), the receiver-side decoding could be realized with maximum likelihood sequence detection (MLSD) for a 9 QAM signal.

After the I and Q signals are combined, the resulting signal can be processed through an M-point fast Fourier Transform (104). The module 104 receives an M point input and N−1 low frequencies points from M points output at the output may be selected for subsequent processing. When M>N−1, a faster than "DAC" OFDM signal is generated. In this regard, M and N represent positive integers.

In general, the power distribution in low frequencies would be expected to be higher than that in high frequencies for duo binary signal (e.g., by 10 dB or more). The ISI caused by dropping M−N+1 high frequency outputs may not very serious to be of a practical detriment.

The output of the M-point FFT may then be processed through module 105 in which an N-point IFFT 15 performed. The output is used for OFDM modulation. The number of subcarriers is N. As the first subcarrier should be reserved for DC-bias, the maximum number of data-carrying subcarriers is N−1.

At 106, a training sequence may be added to facilitate receiver-side processing such as frequency domain equalization (FDE), time synchronization, and channel estimation. In some embodiments, the training sequence may use QPSK modulation.

Following the module 106, a module 107 may be used for adding a cyclic prefix (CP) to each OFDM symbol, e.g., to overcome chromatic dispersion (CD). The size of CP can be adjusted according to the excepted propagation delay for the signal, e.g., the length of optical transmission medium. The output of the CP-added signal may be sent to the DAC stage for further processing and transmission over the optical medium. The processing may include, e.g., polarization division multiplexing (PDM) with another similarly generated optical OFDM signal.

Figure 3:
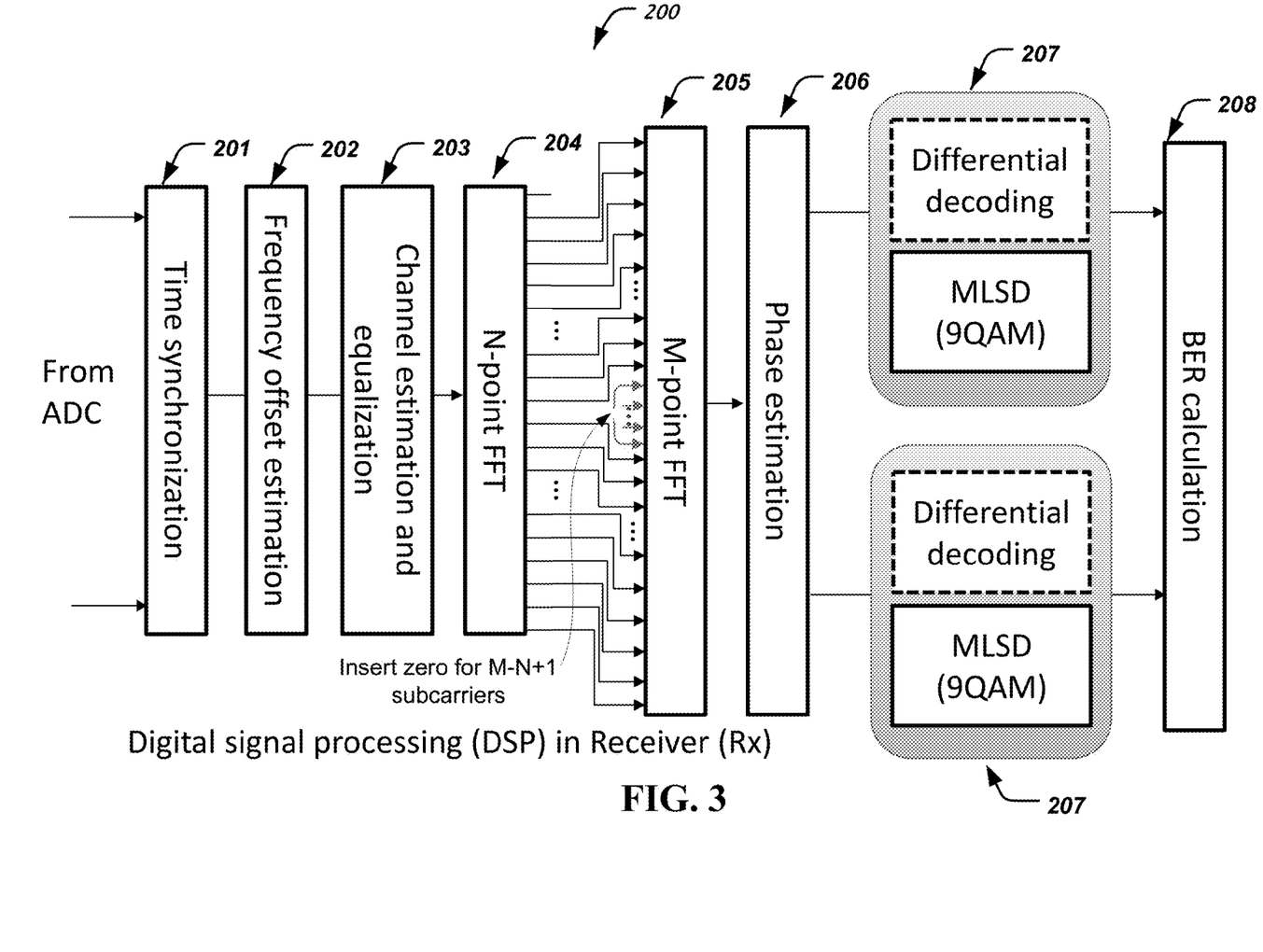
FIG. 3 is an example receiver of optical signals.

FIG. 3 shows an example optical receiver 200 block diagram. The received optical signal may be processed for PDM demodulation and may be converted from analog domain to digital domain using an analog to digital (ADC) conversion module (now shown). The module 201 may perform time synchronization with the received signal. The module 202 may be used for frequency offset estimation (FOE). The FOE can be done with the aid of (1) RF-pilot, (2) Training sequence, or in another way.

When using RF pilot, a narrow band pass filter may be used to selectively filter to recover the RF-pilot and a frequency offset can be estimated with it.

When using the training sequence, since frequency offset leads to cyclic shift in the frequency domain, the training sequence to estimate the amount of cyclic shift to obtain frequency offset.

In module 203, channel estimation and equalization may be performed on the received signal. In some embodiments, for a received single polarization OFDM transmission, an estimate of the channel response is first obtained with training sequence in frequency domain and then equalization is done for each OFDM symbol.

In some embodiments, for a received PDM signal, e.g., a dual polarization OFDM transmission, training sequence may be used not only to generate an estimate of the channel response but also to de-multiplexed dual polarization signal.

After the channel estimation and equalization is performed, the resulting output signal may be processed through an N-points FFT module 204 to produce N output signals.

These signals are then processed through an M-point FFT stage 205. Because the number of input point is M, which is larger than N−1, the M−N+1 subcarriers in low frequencies are filled with zero.

In module 206, phase estimation may be performed. In some embodiments, decision feedback phase estimation may be used. When the modulation format of fast than "DAC" signal is 9-QAM, the symbols after M-point IFFT may be compared to their decision direct symbols to get phase noise.

At module 207, decoding of the phase estimated signal may be performed. The decoding operation may include differential decoding and MLSD. For duo binary OFDM signal with differential encoding, the decoding can be realized with modulo operation, while for the ordinary duo binary the decoding is realized with MLSD. The differential decoding is easy to realized, while the performance should be worse than MLSD.

For experimental purpose, at module 208, the outputs of the decoding module 207 may be compared with the input from the transmitter to estimate BER. The module 208 may not be implemented in actual receivers.

Using the transmitter and receiver side implementations as described with respect to FIG. 2 and FIG. 3, experiments were performed by the inventors to test the effectiveness of the disclosed technology. In some configurations, more than 64 Gbaud OFDM signal with 64 Gsamples/s DAC was observed.

Figure 4:
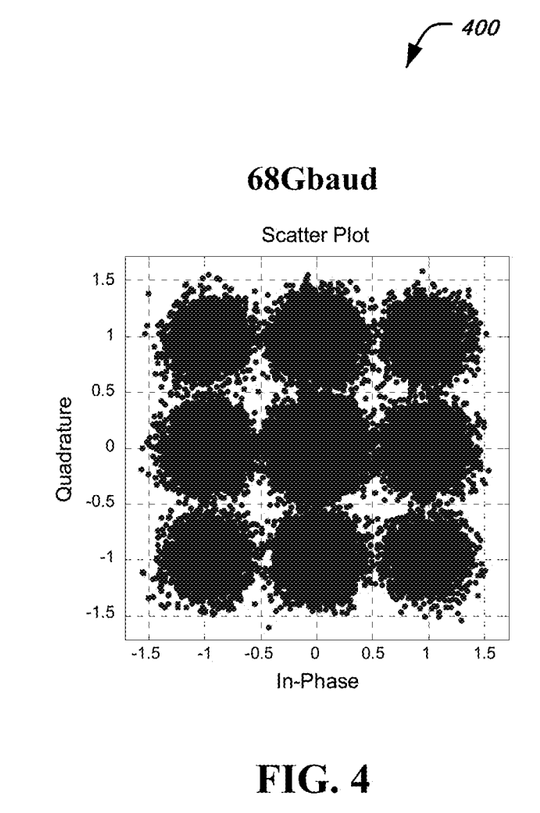
FIG. 4 shows an example of a signal constellation.

FIG. 4 shows a scatter plot of I and Q symbols at 68 Gbaud rate. The BER for one experiment is $1.9e^{-3}$ when using differential decoding and $6.2e^{-4}$ when using MLSD.

Figure 5:
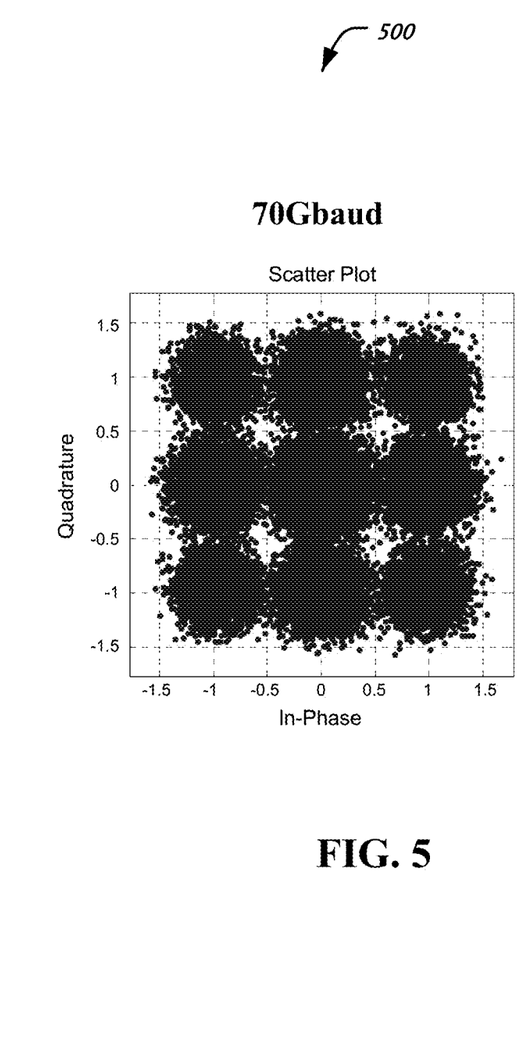
FIG. 5 shows another example signal constellation.

FIG. 5 shows an example scatter plot for 70 Gbaud transmissions. The BER for one experiment is $3.5e^{-3}$ when using differential decoding and $1.2e^{-3}$ when using MLSD.

Figure 6:
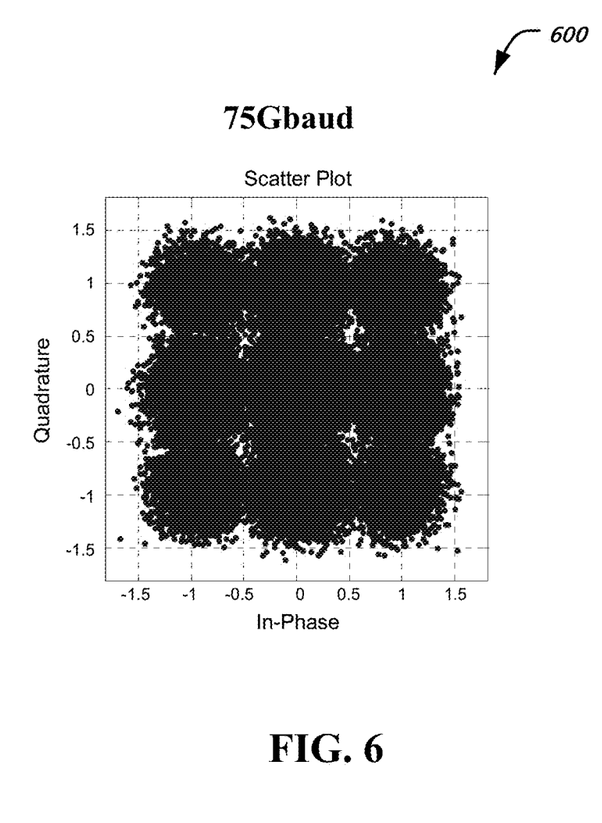
FIG. 6 shows another example signal constellation.

FIG. 6 shows an example scatter plot for 75 Gbaud transmissions. The BER for one experiment is $8.9e^{-3}$ for differential decoding and $7.9e^{-3}$ for MLSD.

Figure 7:
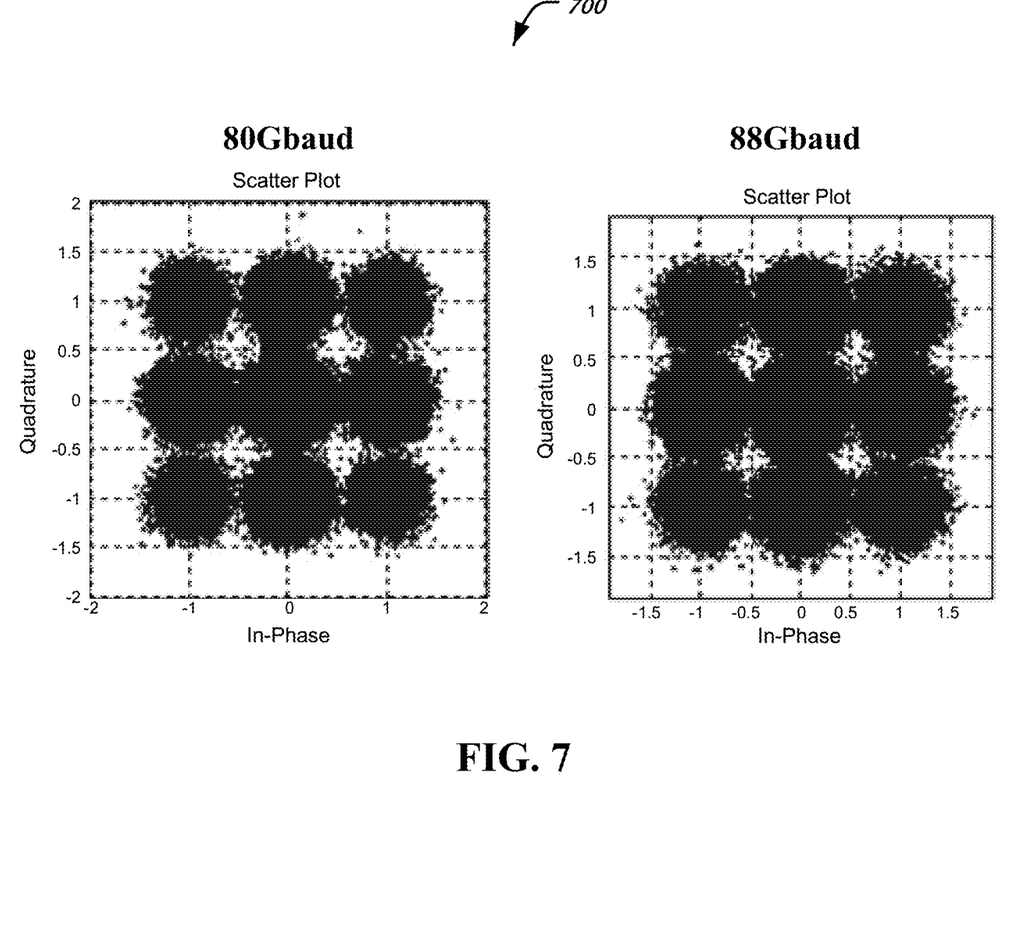
FIG. 7 shows yet another example signal constellation.

FIG. 7 shows example scatter plots for 80 and 88 GBaud transmissions. The BER in one experiment for 80 Gbaud is $2.1e^{-3}$ for differential encoding and $7.1e^{-4}$ for MLSD. The BER in another experiment for 88 GBaud is $4.9e^{-3}$ for differential encoding and $2.7e^{-3}$ for MLSD.

As can be seen from FIG. 4 to FIG. 7, inter-symbol interference increases from the 68 GBaud case to the 88 GBaud cases, as seen from the increasing overlap of the I/Q symbol points in the plot. FIGS. 4-7 also demonstrate that the use of MLSD can improve performance by reducing BER of the signal transmission.

Figure 8:
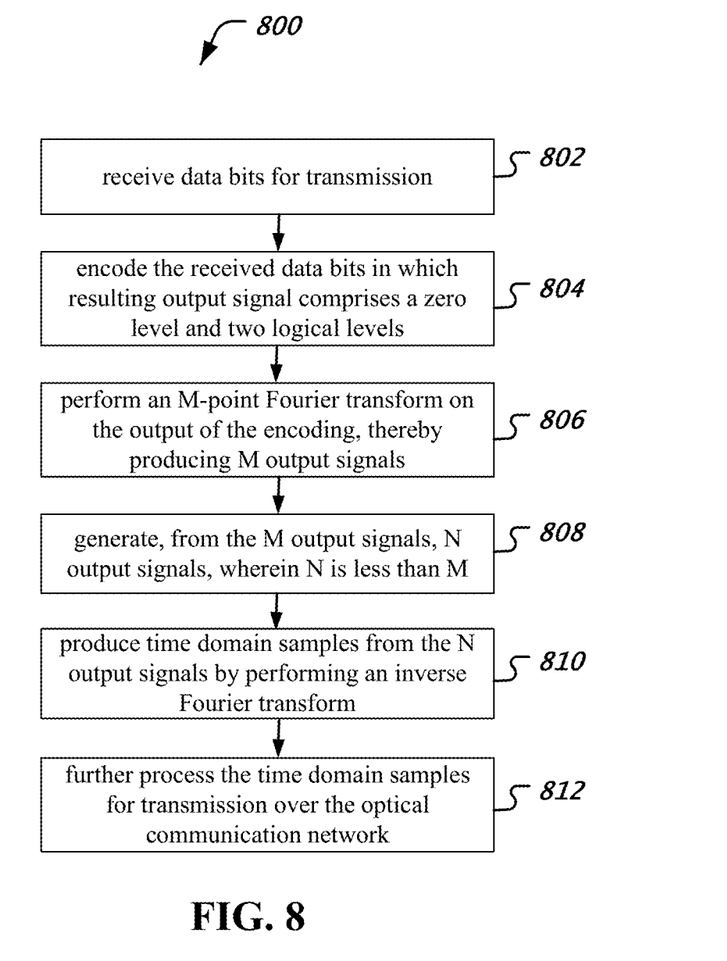
FIG. 8 shows an example method of optical communication.

FIG. 8 shows an example flowchart for a method 800 of transmitting an optical signal using OFDM modulation such that the transmission has a baud rate that is greater than sample rate of a subsequent digital to analog conversion stage that converts an intermediate signal from modulated digital format into analog format that is the optical signal for transmission, e.g., RF up-conversion. The method 800 may be implemented, e.g. at an optical transmitter such as the optical transmitter 702 depicted in FIG. 1.

The method 800 includes, at 802, receiving data bits for transmission over the optical communication network. In some embodiments, the data bits can be a pseudorandom binary stream PRBS shown in 101. The data bits may be received from a user interface, a communication processor, a traffic aggregation stage, e.g., a multiplexer in the transmitter 702. In some embodiments, the data bits may be received at an input interface, e.g., an interface to an internal data bus, for transmission over the optical communication network.

The method 800 includes, at 804, encoding the received data bits such that the encoded data bits are duo-binary comprising a zero level and two logical levels. The logical levels, e.g., may represent a logical 1 (one) and a logical −1, each representing a different signal level. In some embodiments, the encoded data bits may be encoded using a differential encoding scheme, e.g., by adding a one unit time delayed version of digital signal with itself.

The method 800 includes, at 806, performing an M-point Fourier transform on the output of the duo-binary encoding, thereby producing M output signals. One of skill in the art will appreciate that a variety of different Fourier transform techniques and coefficient values can be used to perform the M input M output orthogonal transformation.

The method 800 includes, at 808, generating, from the M output signals, N output signals, wherein N is less than M. In some embodiments, the generation may be performed by pruning, or suppressing or deleting, the M−N highest frequency signals. The pruning, thus reduces the total number of signals, e.g., in the frequency domain, that are processed for further transmission. As described herein, when the pruned signals correspond to the highest frequency content, pre-encoding using duobinary levels can mitigate some of the loss of information in the high frequencies.

The method 800 includes, at 810, producing time domain samples from the N output signals by performing an inverse Fourier transform. A variety of inverse Fourier transform implementations known to one of skill in the art could be used.

The method 800 includes, at 812, further processing the time domain samples for transmission over the optical communication network. The further processing may include, e.g., adding a training sequence to the output of the inverse Fourier transform to enable channel estimation and receiver-side processing. Adding may be accomplished by pre-fixing data symbols and/or post-fixing, and/or inserting at intermediate periods of the time domain samples. The training sequence may include a sequence of QPSK symbols. The further processing may include, e.g., adding a cyclic prefix to mitigate degradations due to transmission over a channel having certain propagation delay. The further processing may include polarization multiplexing with other signals. The further processing may include wave division multiplexing with other optical signals. The further processing may include digital to analog conversion, upconversion to optical transmission frequency, and so on.

Figure 9:
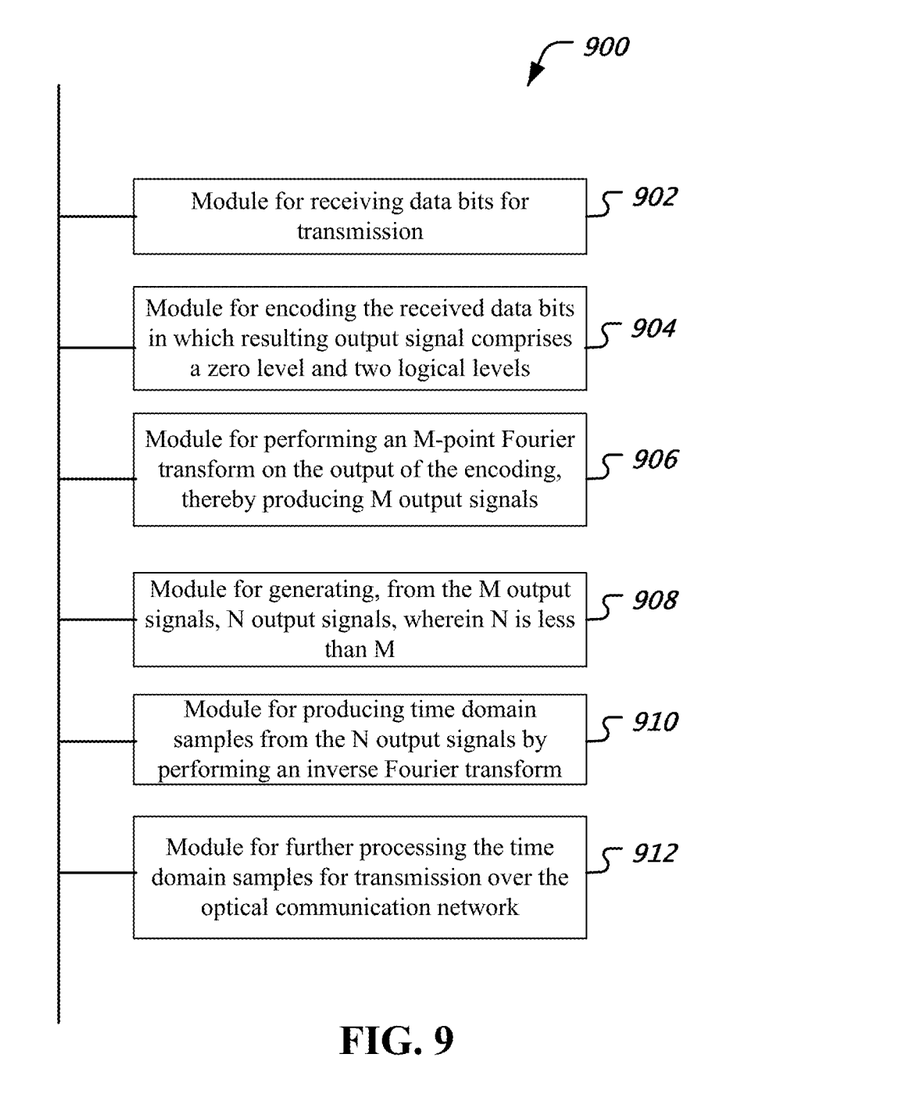
FIG. 9 shows an example optical communication apparatus.

FIG. 9 shows an example of an optical signal transmission apparatus 900. The apparatus 900 may be a part of the optical transmitter 702, depicted in FIG. 1. The apparatus 900 includes a module 902 that receives data bits for transmission over the optical communication network, a module 904 that performs a duo-binary encoding of the received data bits in which resulting output duo-binary signal includes three logical signal levels, a module 906 that performs an M-point Fourier transform on the output of the duo-binary encoding, thereby producing M output signals, a module 908 that generates, from the M output signals, N output signals, wherein N is less than M, a module 910 that produces time domain samples from the N output signals by performing an inverse Fourier transform, and a module 912 that further processes the time domain samples for transmission over the optical communication network.

Figure 10:
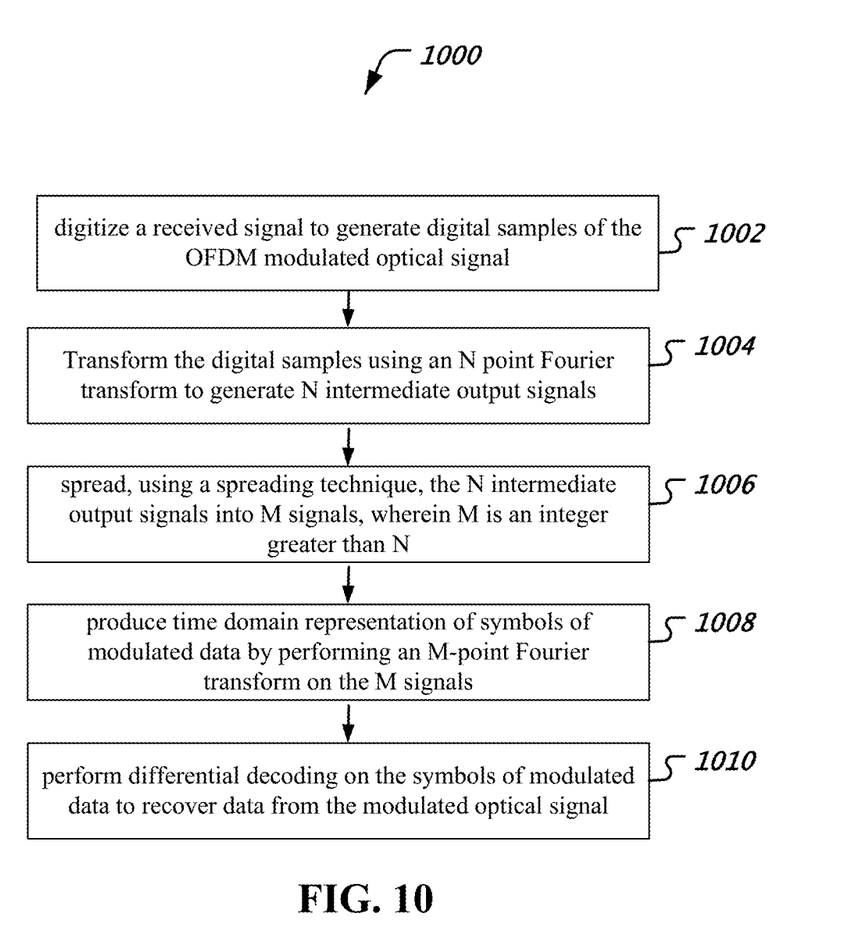
FIG. 10 shows an example optical communication reception method.

FIG. 10 shows an example flowchart for a method 1000 of receiving a duo-binary encoded OFDM signal. The method 1000 may be implemented, e.g., at an optical receiver such as the optical receiver 706.

The method 1000 includes, at 1002, digitizing a received signal to generate digital samples of the OFDM modulated optical signal. The digitization may be performed using an analog to digital conversion technique known to one of skill in the art.

The method 1000 includes, at 1004, transforming the digital samples using an N point Fourier transform to generate N intermediate output signals. One of skill in the art will appreciate that a variety of different Fourier transform techniques, e.g., butterfly, fast Fourier transform, etc. can be used to perform the N input N output orthogonal transformation. The N samples used as input to the N point Fourier transform may be N consecutive digital samples output of the analog to digital conversion.

The method 1000 includes, at 1006, spreading, using a spreading technique, the N intermediate output signals into M signals, wherein M is an integer greater than N. The spreading may be achieved by padding the N signals intermediate signals with M−N zero valued signals. In some embodiments, central M−N points may be selected for padding with zero values.

The method 1000 includes, at 1008, producing time domain representation of symbols of modulated data by performing an M-point Fourier transform on the M signals. A variety of Fourier transform implementations known to one of skill in the art could be used.

The method 1000 includes, at 1010, performing differential decoding on the symbols of modulated data to recover data from the modulated optical signal. The differential decoding can convert encoded data bits from a duo-binary encoded signal, e.g., logical levels +1, −1 and 0, to a binary encoded signal, e.g., logical levels 1 and 0.

In some embodiments, the method 1000 may include performing polarization demodulation of the received signal, e.g., when the signal is PDM modulated.

In some embodiments, the method 1000 includes using a MLSD decision process, as described herein. The MLSD process may be particularly advantageous to use during recovery of modulated data because the use of differential encoding, e.g., duo-binary encoding, typically introduced correlation between adjacent symbols. Put differently, encoded data bits, when received at a receiver, may appear as if the encoded data bits have been encoded through a trellis encoder with depth one. The trellis search aspect of MLSD search for a most probable path in the bit decision process thus produces superior BER results when used with duo-binary encoded signals described herein.

Figure 11:
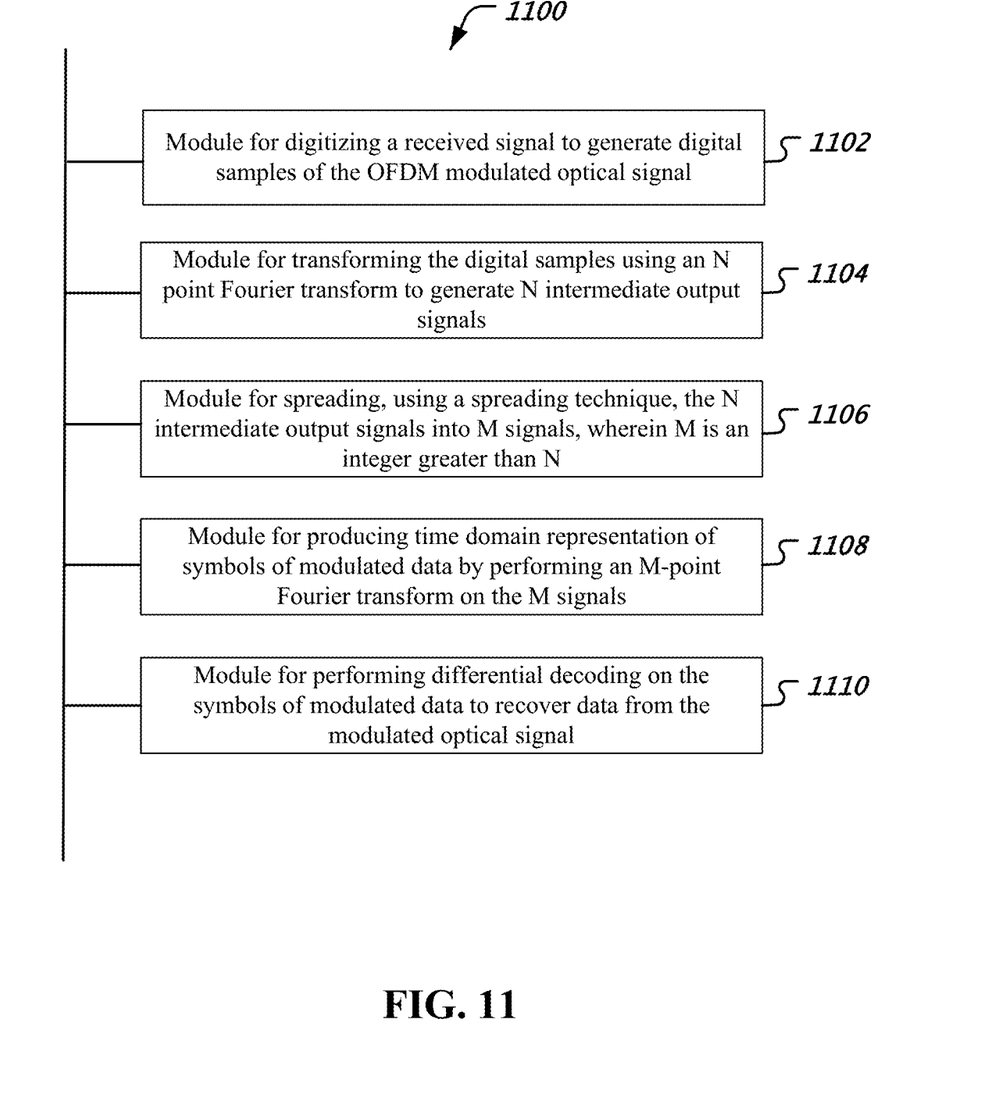
FIG. 11 shows an example optical communication receiver apparatus.

FIG. 11 is a block diagram representation of an example of an optical signal reception apparatus 1100. The apparatus 1100 includes a module 1102 for digitizing a received signal to generate digital samples of the OFDM modulated optical signal. The digitization may be performed using an off-the-shelf analog to digital conversion solution or may be performed using another ADC technique. The apparatus 1100 includes a module 1104 for transforming the digital samples using an N point Fourier transform to generate N intermediate output signals. The transformation may be implemented using a butterfly Fourier transform, a digital signal processor that executes a Fourier transform algorithm, etc. The apparatus 1100 includes a module 1106 for spreading, using a spreading technique, the N intermediate output signals into M signals, wherein M is an integer greater than N. The spreading may be achieved by increasing array size allocated to the intermediate signals by inserting zero values. The apparatus 1100 includes a module 1108 for producing time domain representation of symbols of modulated data by performing an M-point Fourier transform on the M signals. The Fourier transform may be performed using digital signal processor, as described herein. The apparatus 1100 includes a module 1110 for performing differential decoding on the symbols of modulated data to recover data from the modulated optical signal. In some embodiments, the differential decoding may be implemented using a delay line or using software executed, e.g., on a digital signal processor.

It will be appreciated that several techniques have been disclosed herein to enable data transmission in which a baud rate that is greater than the sample rate of the DAC stage is used at the transmitter, and correspondingly such transmissions are received and demodulated at a receiver to recover the transmitted data. It will further be appreciated that, in some embodiments, duobinary encoding is used at the transmitter to achieve the high baud rate. In one advantageous aspect, the use of duobinary encoding mitigates high frequency corruption or ISI.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
   receiving data bits for transmission over the optical communication network;
   encoding the received data bits such that the encoded data bits are duo-binary comprising a zero level and two logical levels;
   performing an M-point Fourier transform on the output of the duo-binary encoding, thereby producing M output signals;
   generating, from the M output signals, N output signals by eliminating M-N signals representing highest frequency signals from the M output signals, wherein N is less than M;
   producing time domain samples from the N output signals by performing an inverse Fourier transform; and
   adding a cyclic prefix to the time domain samples for further processing the time domain samples for transmission over the optical communication network.

2. The method of claim 1, wherein the encoding includes:
   adding, to the received data bits, a delayed version of the received data bits.

3. The method of claim 1, wherein the further processing comprises:
   adding a training sequence comprising a quadrature phase shift keying (QPSK) modulated pre-defined sequence to the time domain samples.

4. The method of claim 1, wherein the further processing includes performing polarization division multiplexing with another modulated optical signal.

5. A method of recovering data from an orthogonal frequency division multiplexing (OFDM) modulated optical signal, implemented at an optical receiver, comprising:
   digitizing a received signal to generate digital samples of the OFDM modulated optical signal;
   transforming the digital samples using an N point Fourier transform to generate N intermediate output signals;
   spreading the N intermediate output signals into M signals by generating M-N signals having zero values, wherein M is an integer greater than N;
   producing time domain representation of symbols of modulated data by performing an M-point Fourier transform on the M signals; and
   performing decoding on the symbols of modulated data to recover data from the modulated optical signal.

6. The method of claim 5, further including:
   performing, prior to transforming, polarization domain demultiplexing of the digital samples.

7. The method of claim 5, wherein the performing decoding includes:
   making decision maximum likelihood sequence detection to recover data from the modulated optical signal.

8. The method of claim 5, wherein the performing decoding includes performing duo-binary decoding on the symbols of modulated data.

9. The method of claim 5, wherein the M-N zero values are added at a center of the N signals.

10. An optical receiver for recovering data from an orthogonal frequency division multiplexing (OFDM) modulated optical signal comprising a digital signal processor that reads instructions from a computer-readable storage medium and implements a method, comprising:
    controlling a digitizer to digitize a received signal to generate digital samples of the OFDM modulated optical signal;
    transforming the digital samples using an N point Fourier transform to generate N intermediate output signals;
    spreading the N intermediate output signals into M signals by generating M-N signals having zero values, wherein M is an integer greater than N;
    producing time domain representation of symbols of modulated data by performing an M-point Fourier transform on the M signals; and
    performing decoding on the symbols of modulated data to recover data from the modulated optical signal.

11. The optical receiver of claim 10, further including:
    performing, prior to transforming, polarization domain demultiplexing of the digital samples.

12. The optical receiver of claim 10, wherein the performing decoding includes:
    making decision maximum likelihood sequence detection to recover data from the modulated optical signal.

13. The optical receiver of claim 10, wherein the performing decoding includes performing duo-binary decoding on the symbols of modulated data.

14. The optical receiver of claim 10, wherein the M-N zero values are added at a center of the N signals.

15. An optical communication system comprising an optical transmitter and at least one optical receiver, wherein the optical transmitter implements a method comprising:
    receiving data bits for transmission over the optical communication network,
    encoding the received data bits such that the encoded data bits are duo-binary comprising a zero level and two logical levels,
    performing an M-point Fourier transform on the output of the duo-binary encoding, thereby producing M output signals,
    generating, from the M output signals, N output signals by eliminating M-N signals representing highest frequency signals from the M output signals, wherein N is less than M,
    producing time domain samples from the N output signals by performing an inverse Fourier transform, and adding a cyclic prefix to the time domain samples for further processing the time domain samples for transmission over the optical communication network;

and the at least one optical receiver implements a method of recovering data, comprising:

digitizing a received signal to generate digital samples of the OFDM modulated optical signal, transforming the digital samples using an N point Fourier transform to generate N intermediate output signals, spreading the N intermediate output signals into M signals by generating M−N signals having zero values, wherein M is an integer greater than N, producing time domain representation of symbols of modulated data by performing an M-point Fourier transform on the M signals, and performing decoding on the symbols of modulated data to recover data from the modulated optical signal.

16. The system of claim 15, wherein the encoding includes:

adding, to the received data bits, a delayed version of the received data bits.

17. The system of claim 15, wherein the further processing comprises:

adding a training sequence comprising a quadrature phase shift keying (QPSK) modulated pre-defined sequence to the time domain samples.

18. The system of claim 15, wherein the further processing includes performing polarization division multiplexing with another modulated optical signal.

19. The system of claim 15, wherein the method of recovering data further includes:

performing, prior to transforming, polarization domain demultiplexing of the digital samples.

20. The system of claim 15, wherein the performing decoding includes:

making decision maximum likelihood sequence detection to recover data from the modulated optical signal.

21. The system of claim 15, wherein the performing decoding includes performing duo-binary decoding on the symbols of modulated data.

22. The system of claim 15, wherein the M−N zero values are added at a center of the N signals.

23. An optical transmitter for optical communication, comprising a digital signal processor that reads instructions from a computer-readable storage medium and is operable to:

receive data bits for transmission over the optical communication network;

encode the data bits such that the encoded data bits are duo-binary comprising a zero level and two logical levels;

perform an M-point Fourier transform on the output of the duo-binary encoding, thereby producing M output signals;

generate, from the M output signals, N output signals by eliminating M−N signals representing highest frequency signals from the M output signals, wherein N is less than M;

produce time domain samples from the N output signals by performing an inverse Fourier transform; and add a cyclic prefix to the time domain samples for further processing the time domain samples for transmission over the optical communication network.

24. The optical transmitter of claim 23, wherein the digital signal processor is operable to encode by adding, to the received data bits, a delayed version of the received data bits.

25. The optical transmitter of claim 23, wherein the digital signal processor is operable to add a training sequence comprising a quadrature phase shift keying (QPSK) modulated pre-defined sequence to the time domain samples for further processing the time domain samples for transmission over the optical communication network.

26. The optical transmitter of claim 23, wherein the digital signal processor is operable to perform polarization division multiplexing with another modulated optical signal for further processing the time domain samples for transmission over the optical communication network.

* * * * *